United States Patent
Lavery

(10) Patent No.: US 9,137,776 B2
(45) Date of Patent: Sep. 15, 2015

(54) AUTOMATIC MODE CHANGE IN ULTRASONIC LOCATIONING

(71) Applicant: SYMBOL TECHNOLOGIES, INC., Schaumburg, IL (US)

(72) Inventor: Richard J Lavery, Huntington, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/067,099

(22) Filed: Oct. 30, 2013

(65) Prior Publication Data

US 2015/0119067 A1    Apr. 30, 2015

(51) Int. Cl.

| H04W 24/00 | (2009.01) |
|---|---|
| G01S 1/72 | (2006.01) |
| G01S 1/74 | (2006.01) |
| G01S 1/80 | (2006.01) |
| G01S 5/18 | (2006.01) |
| G01S 5/30 | (2006.01) |
| G01S 5/20 | (2006.01) |
| G01S 5/24 | (2006.01) |
| G01S 5/22 | (2006.01) |
| H04W 64/00 | (2009.01) |

(52) U.S. Cl.
CPC .................................. H04W 64/003 (2013.01)

(58) Field of Classification Search
None
See application file for complete search history.

(56) References Cited

U.S. PATENT DOCUMENTS

| 6,553,013 B1 * | 4/2003 | Jones et al. .................... 370/328 |
|---|---|---|
| 7,738,884 B2 | 6/2010 | Cheung et al. |
| 8,299,894 B1 | 10/2012 | Semeniuk |
| 8,604,909 B1 * | 12/2013 | Amir et al. ...................... 340/8.1 |
| 2002/0147591 A1 | 10/2002 | Beyo et al. |
| 2005/0113110 A1 * | 5/2005 | Joo et al. ..................... 455/456.1 |
| 2009/0131794 A1 | 5/2009 | Yao et al. |
| 2009/0190441 A1 * | 7/2009 | Zhao et al. ..................... 367/128 |
| 2009/0295639 A1 * | 12/2009 | Zhao et al. ..................... 342/387 |
| 2010/0109849 A1 * | 5/2010 | Wang et al. ................... 340/10.5 |
| 2011/0306370 A1 * | 12/2011 | Zhao et al. ..................... 455/500 |
| 2012/0108258 A1 * | 5/2012 | Li ................................ 455/456.1 |
| 2013/0316740 A1 * | 11/2013 | Scarafia et al. ............ 455/456.5 |
| 2014/0099974 A1 * | 4/2014 | CHUN et al. ............... 455/456.3 |
| 2014/0228059 A1 * | 8/2014 | Jalali .......................... 455/456.6 |
| 2014/0340994 A1 * | 11/2014 | Calvarese ..................... 367/117 |

FOREIGN PATENT DOCUMENTS

| DE | 10 2009 004 928 A1 | 7/2010 |
|---|---|---|
| GB | 2332053 A | 6/1999 |

* cited by examiner

*Primary Examiner* — King Poon
*Assistant Examiner* — Vincent Peren

(57) ABSTRACT

A method and system for changing modes for ultrasonic locationing of a mobile device includes transmitting ultrasonic pulses using a transmit schedule by fixed ultrasonic emitters. When a fixed access point begins serving a new mobile device, those ultrasonic emitters proximal to the access point are deactivated and associated microphones are activated to receive an acoustic tone from the new mobile device. This acoustic tone is used to establish an initial location of the new mobile device using measurements of the received acoustic tone at each proximal microphone. The transmit schedule is adapted to accommodate the new mobile device at the initial location, and the proximal ultrasonic emitters are returned to transmit mode. In this way, an accurate starting position of the new mobile device is established without greatly interrupting other mobile devices that are currently being located.

18 Claims, 3 Drawing Sheets

AUTOMATIC MODE CHANGE IN ULTRASONIC LOCATIONING

BACKGROUND

An ultrasonic receiver can be used to determine its location with reference to one or more ultrasonic emitters, such as locating a mobile device having an ultrasonic receiver and being present within a retail, factory, warehouse, or other indoor environment, for example. The ultrasonic emitter(s) can transmit ultrasonic energy in a short pulse which can be received by an ultrasonic transducer (audio microphone) in the ultrasonic receiver. The use of several ultrasonic emitters distributed within the environment can be used to determine a specific location of a particular device using techniques known in the art such as measuring time-of-flight or signal strength of the emitter signals and using triangulation, trilateration, and the like, as have been used in radio frequency locationing systems.

However, having many mobile devices trying to establish their position within the environment, and interacting with all the emitters in the environment cannot be done simultaneously due to signal interference. One of the most valuable resources for a pulse-based time of flight (TOF) ultrasonic locationing system is time. Therefore, an advanced scheduler algorithm can be used for time-slicing, where each emitter can send its ultrasonic pulse, and there is a wait time for any echoes to settle before subsequent ultrasonic pulses are sent. The scheduler needs to coordinate which emitters are active at particular times so as to not interfere with nearby emitters. As a result, mobile devices are limited in how often they can update their location, i.e. location update rate. The location update rate of the system is directly tied to how efficient the scheduler algorithm is in servicing the available mobile devices that need to be located. Therefore, this solution solves the interference problem, but results in a poor location update rate.

Another problem occurs when enrolling new mobile devices into the locationing system, which requires that the scheduler be interrupted periodically to run an enrollment mode which identifies where any new devices are so that they can be incorporated into the scheduler algorithm. This will periodically interrupt the locationing system for multiple seconds, negatively impacting the system performance and update rate.

Accordingly, there is a need for a technique to locate a mobile device in an indoor environment without modifying the mobile device hardware and while eliminating the aforementioned issues. Furthermore, other desirable features and characteristics of the present invention will become apparent from the subsequent detailed description and the appended claims, taken in conjunction with the accompanying drawings and the foregoing background.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
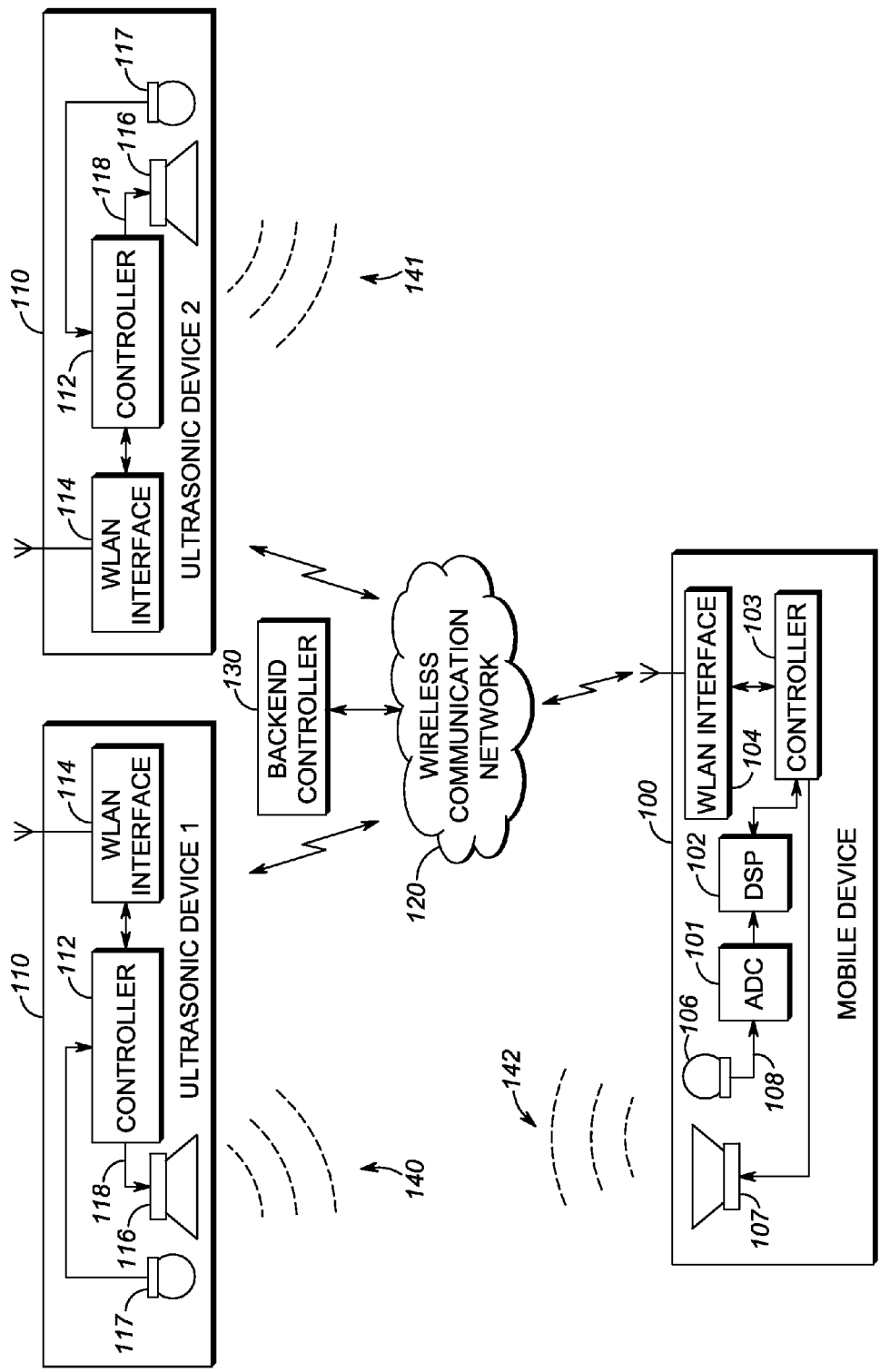
FIG. 1 is a simplified block diagram of an ultrasonic locationing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described for changing modes for locating a mobile device in an indoor environment without modifying the mobile device hardware and while eliminating problems associated with interference and a poor position update rate, as will be detailed below.

The device to be located can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a communication device. Each device comprises a processor that can be further coupled to a keypad, a speaker, a microphone, audio circuitry, a display, signal processors, and other features, as are known in the art and therefore not shown or described in detail for the sake of brevity.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, servers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, and/or expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of an ultrasonic locationing system, in accordance with the present invention. A plurality of ultrasonic transponders such as a piezoelectric speaker or emitter 116 can be implemented in ultrasonic devices 110 within the environment. Each emitter can broadcast a short pulse of ultrasonic sound (e.g. 140, 141) within the environment to be used for locationing of mobile devices 100. The mobile device 100 can include a digital signal processor 102 to process the ultrasonic signal 140 received by a transponder such as a microphone 106, and specifically the frequency components of the signals 140, 141 from the ultrasonic emitters 116 in accordance with the present invention.

Similarly, each ultrasonic device 110 can include a transponder such as a microphone 117. A mobile device speaker 107 can broadcast a short acoustic tone 142 within the environment to ultrasonic devices (e.g. 110, 117) to be used to enroll the mobile device 100 for locationing.

The mobile device 100 can include a digital signal processor 102 to process the ultrasonic signal 140 received by a transponder such as a microphone 106, and specifically the frequency components of the signals 140, 141 from the ultrasonic emitters 116 in accordance with the present invention. The microphone 106 provides electrical signals 108 to receiver circuitry including a signal processor 102. It is envisioned that the mobile device can use existing audio circuitry with sampling frequencies up to 44.1 kHz, i.e. the typically utilized Nyquist frequency for commercial audio devices, which relates to a 22.05 kHz usable upper frequency limit for processing audio signals. It is envisioned that the mobile device receiver circuitry is implemented in the digital domain using an analog-to-digital converter 101 coupled to a digital signal processor 102, for example. It should be recognized that other components, including amplifiers, digital filters, and the like, are not shown for the sake of simplicity of the drawings. For example, the microphone signals 108 can be amplified in an audio amplifier after the microphone 106. The receiving circuitry of the ultrasonic devices 110, 117 can also be implemented in the digital domain using an analog-to-digital converter coupled to a digital signal processor (not shown). It should be recognized that other components, including amplifiers, digital filters, and the like, are also not shown for the sake of simplicity of the drawings.

The mobile device processor 102 can also be coupled to a controller 103 and wireless local area network interface 104 for wireless communication with other devices, and backend controllers 130 in the communication network 120. Each ultrasonic device 110 can be coupled to its own controller 112 and wireless local area network interface 114 for wireless communication with the server or backend controller 130 in the communication network 120. Alternatively, either or both of the mobile device 100 and ultrasonic devices 110 could be connected to the communication network 120 through a wired interface connection (not represented), such as an Ethernet interface connection. The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 80111, 802.16, or 802.20, modified to implement embodiments of the present invention. The protocols and messaging needed to establish such networks are known in the art and will not be presented here for the sake of brevity.

The controller 112 of each ultrasonic device 110 provides the speaker 116 either with an ultrasonic pulse or a steady tone 140, 141 to emit. The speaker will broadcast the pulse with a duration of approximately 2 milliseconds or less for flight time measurements, or the steady tone with a duration of approximately 200 milliseconds or less for signal strength measurements. The particular frequency and pulse timing to be used by each ultrasonic device 110 can be directed by the backend controller 130 via the network 120. The emitters are configured to have usable output across about a 19-22 kHz frequency range.

The controller 103 of each mobile device 100 can direct the speaker 107 to emit an acoustic tone 142 to emit to proximal ultrasonic devices 110 when the mobile device needs to be enrolled in the locationing system. The speaker will broadcast the acoustic tone with a duration of 200 milliseconds or less to nearby ultrasonic devices 110. The particular acoustic tone frequency and timing to be used by each mobile device 100 can be directed by the backend controller 130 via the network 120 or by a specific software application provided to the mobile device. The speaker 107 is configured to have usable output across about a 19-22 kHz frequency range.

The processor 102 of the mobile device 100 is operable to discern the particular frequency of the pulse received in its microphone signal 108. The pulse is broadcast at a frequency within the frequency range of about 19-22 kHz to enable the existing mobile device processor 102 analyze the pulse in the frequency domain to detect its presence. The 19-22 kHz range has been chosen such that the existing audio circuitry of the mobile device will be able to detect ultrasonic frequencies without any users within the environment hearing the frequencies. In addition, it is envisioned that there is little audio noise in the range of 19-22 kHz to interfere with the ultrasonic frequencies. Similarly, the controller 112 of the ultrasonic device 110 is operable to discern the particular ultrasonic frequency received in its microphone 117. The acoustic tone from the mobile device can also be broadcast at a frequency within the frequency range of about 19-22 kHz.

It is envisioned that the processor 102 of the mobile device and the controller 112 of the ultrasonic device will use a Fast Fourier Transform (FFT) to detect the tones for received signal strength indicator (RSSI) measurements in the frequency domain. A Goertzel algorithm can be used to detect timing for pulsed flight time measurements. The present invention operates within a limited ultrasonic frequency range of 19-22.05 kHz. Given that the pulse duration needs to be very short for accuracy, and due to limited smart phone capabilities, only one or two different high sound pressure level (SPL) frequencies can be used before they overlap within this frequency range. Also, due to Doppler shifts that can occur with a mobile device, guard bands between specific frequencies must be used when operating in RSSI mode, and therefore the amount of discernible frequency tones that can be accurately recognized within this range is limited. In the ultrasonic band of interest (19 kHz to 22.05 kHz), it is only possible to distinguish four or five distinct tones while still leaving room for as much as +1-125 Hz of Doppler shift (enough margin to accommodate that which would be present from a very fast walking speed).

When operating in flight time pulse mode, each ultrasonic pulse should last on the order of 2 ms in duration and can have a high SPL to provide a signal capable of penetrating intervening objects (e.g. shelving) directly to the mobile device, even if the emitter is not in a line-of-sight of the mobile device. When operating in RSSI mode, each ultrasonic tone should last on the order of 200 ms in duration. Also, this will allow the FFT processing to collect enough samples to provide a definitive tone identification.

Each emitter 116 is configured to broadcast the pulse over a limited coverage area or region. For unobtrusiveness and clear signaling, the emitters can be affixed to a ceiling of the environment, where the position and coverage area of each emitter is known and fixed, with the emitter oriented to emit a downward pulse towards a floor of the environment, such that the pulse from an emitter is focused to cover only a limited, defined floor space or region of the environment.

Figure 2:
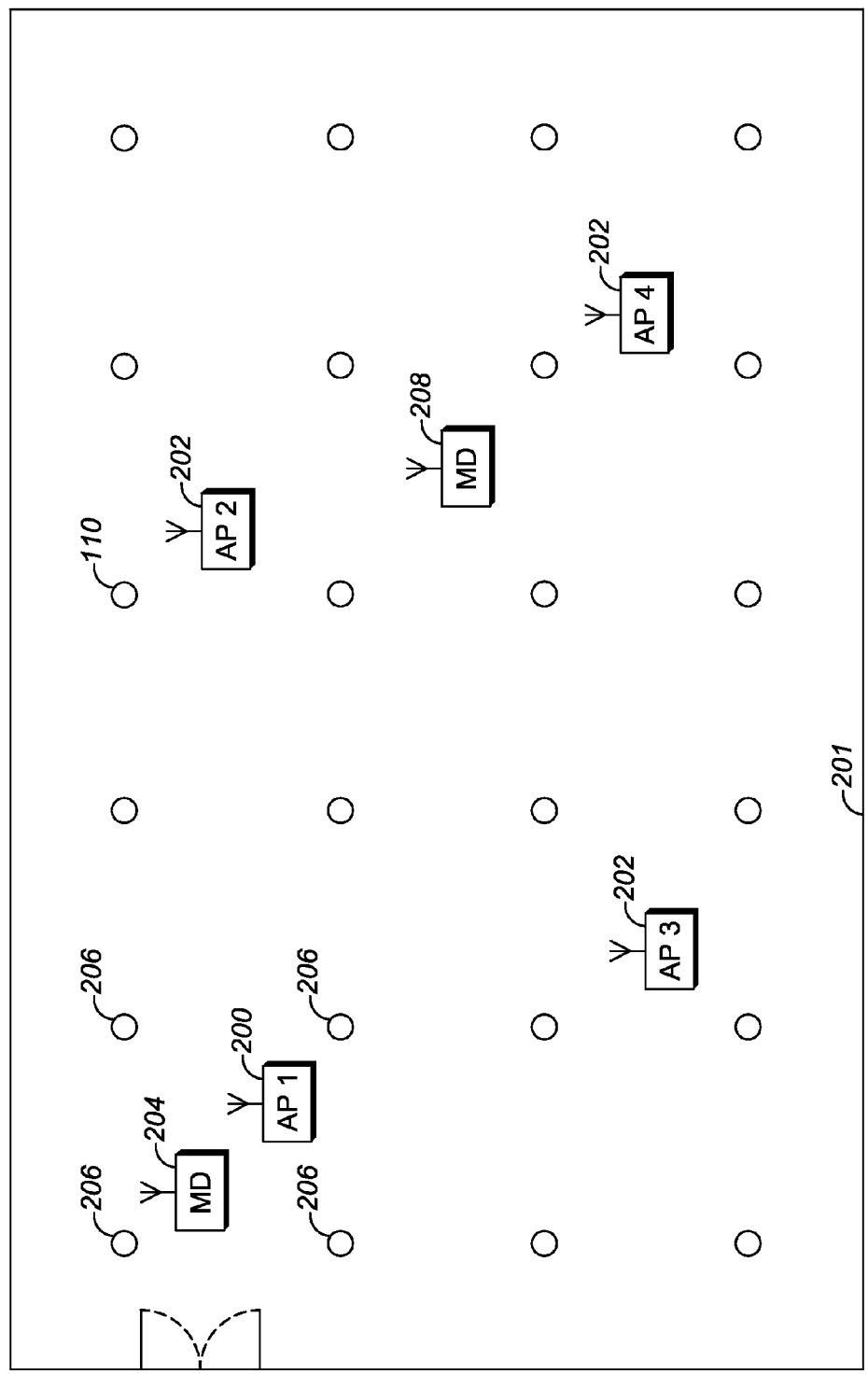
FIG. 2 is a plan view of ultrasonic emitters in an indoor environment, in accordance with some embodiments of the present invention.

In practice, and referring to FIG. 2, it has been determined that one ultrasonic device in a typical retail environment 201 can provide a coverage area of about fifty feet square. FIG. 2 shows a specific example of a top view of a retail store environment. Twenty-four ultrasonic devices 110 are shown affixed to a ceiling of the store in a regular fifty-foot grid (although irregular placement could also be accommodated). Therefore, a plurality of ultrasonic devices 110 is provided to completely cover an indoor environment, and these emitters are spaced in a grid about fifty feet apart. A mobile device (e.g. MD 204) that enters the environment and associates to an access point (e.g. AP1 200) of the wireless local area network (WLAN) of the backend controller is provided a software application to implement the locationing techniques described herein, in accordance with the present invention.

For locationing purposes, the backend controller can direct specific ultrasonic devices 110 to emit their pulses at particular times during a transmit mode, i.e. the ultrasonic device is transmitting pulses and the mobile device is listening for the pulses. Ultrasonic devices in neighboring regions do not emit their ultrasonic pulse at the same time, to avoid interference, although emitters in non-neighboring regions can emit their ultrasonic pulse at the same time if there is minimum interferences therebetween. Different frequencies, groups of frequencies, pulse durations, and pulse timings can be used by each ultrasonic device. A mobile communication device can receive these pulses during transmit mode and provide information to the backend controller, which the backend controller can use to locate the mobile device. For example, the mobile device can transmit timing, and possibly frequency, information about the pulses it detects over the communication network 120 to a backend controller 130 that can determine the location of the mobile device based on this information and a known floor plan of the ultrasonic device locations. It is assumed that the timing of the backend controller and mobile devices is synchronized.

In one scenario, the mobile device can simply measure the time that it receives pulses for two or more different emitters, and supply this timing information to the backend controller. The back end controller, knowing the time that it directed each ultrasonic device to send its pulse can then determine the flight time to the mobile device for each pulse, subtracting the two times to determine flight time. Using known trilateration techniques, the backend controller can then determined the location of the mobile device. In another scenario, the mobile device can measure the signal strength of received pulses for two or more different emitters, and supply signal strength and timing information to the backend controller. The back end controller, knowing the time that it directed each ultrasonic device to send its pulse can then determine the distance to the mobile device for each emitter's pulse, closer emitters producing stronger tones. Using known trilateration techniques, then backend controller can then determined the location of the mobile device. It should be recognized that the particular frequencies of the pulses could be changed during operation.

The present invention dynamically and automatically changes the mode of operation of the locationing system from a transmit mode to a receive mode when it is known that a mobile device needs to be enrolled in the locationing system. For example, it may be that a new device has entered the store and has opted in to having its location tracked. Of it may be that the backend controller loses location information for one or more mobile device, even though those mobile devices can still communicate with the backend controller over the wireless connection. In order to establish a location for this mobile device, the system will enroll this mobile device for locationing by the backend controller.

The present invention provides a quick and efficient way to locate the mobile device using a "macro-locationing" technique in which the ultrasonic device infrastructure in a receive mode receives an acoustic tone transmitted from the mobile device. After the initial macro-locationing event is completed, the system can revert back to a "micro-locationing" mode in which the ultrasonic device infrastructure in a transmit mode transmits pulses to the mobile devices. The ultrasonic device can make use a simple chip microphone at the bottom of the device, to listen for a high frequency acoustic tone emitted by a mobile device that intends to be enrolled in the locationing system. The relative amplitude of the acoustic tone recorded on each ultrasonic device is indicative of the distance between the ultrasonic device and the mobile device. This allows a quick and accurately estimate of the approximate starting position of the mobile device without greatly interrupting the devices that are currently being located.

In particular, the following procedure will be used to enroll a new phone into the system, in accordance with the present invention, and referring to FIG. 2. A new customer in the store starts the connected shopper application downloaded onto their smartphone in some unknown part of the store and "opts in" to being located by the system. The backend controller can identify which Wi-Fi™ access point in its wireless local area communication network the customer's smartphone is connected to, which implies a broad area of possible locations covering multiple ultrasonic devices. In this example, the mobile device 204 has registered with AP1 200. Only those ultrasonic devices 206 within a reasonable range proximal to the AP1 200, and by associated the newly registered mobile device 204, would be temporarily put into a receive mode in which their microphones would be active.

The backend controller informs the mobile device though the Wi-Fi™ network to emit a high frequency acoustic tone for 200 milliseconds. The proximal ultrasonic devices 206, being in receive mode, are directed to receive this acoustic tone by the backend controller through the Wi-Fi™ network, and would capture about 100 milliseconds of audio data, perform a FFT, and record the amplitude of the transmitted acoustic tone. The backend controller can then compare the recorded amplitudes at each ultrasonic device 206 and determine which of those ultrasonic devices are closest to the mobile device 204. A higher recorded amplitude is indicative of a smaller distance between an ultrasonic device and the mobile device. The macro-locationing mode completes when the system determines which four ultrasonic devices 206 are closest to the mobile device 204.

Once the system knows which ultrasonic devices 206 are closest to the mobile device, a timing scheduler in the backend controller can be updated to include the new mobile device in its flight time scheduling and the system can return to micro-locationing transmit mode of operation. The system described above can also be employed at other times in system operation when micro-locationing mode of operation is not feasible.

Each of the ultrasonic devices 206 in receive mode that receive the acoustic tone can send a response back to the backend controller including the recorded signal strength of the received acoustic tone from the mobile device. The respective response can also include an identity (i.e. WLAN Media Access Control address) of the ultrasonic device. Since the location of each emitter is known, the backend controller can use this to provide a rough location of the mobile device—near that emitter. After determining the rough location of the mobile device, the backend controller can then direct the ultrasonic devices to revert to transmit mode in order to enter the locationing mode to provide finer locationing procedures using flight time measurements.

Each mobile device can then perform its locationing measurements needed by the backend controller using the locationing pulses broadcast from emitters activated by the backend controller in accordance with the timing schedule. The locationing pulses are between 19 kHz and 22.05 kHz such that the mobile device can utilizes existing audio circuitry. The locationing pulses provide time-of-flight information and/or signal strength information for the communication device to use for locationing. The backend controller can then use standard trilateration techniques to determine the precise location of the mobile device.

In operation, emitters within interference range of each other take turns sending ultrasonic pulses in accordance with the timing schedule. Those emitters out of interference range, e.g. in non-neighboring regions, could send their pulses simultaneously as long as their positions are known separately.

In this example, enrollment in receive mode will take about one-half to one second. During locationing transmit mode, those mobile devices that are using flight time measurements are expected to have a position update rate of about every 500 mS (two updates per second for three samples—averaging 1.5 seconds. Those mobile devices that are using signal strength measurements for locationing are expected to have a position update rate of about every two seconds with three samples—averaging 6 seconds.

Advantageously, while mobile device is being enrolled using the four ultrasonic devices 206 in receive mode the other twenty ultrasonic devices 110 can remain in transmit mode in order to provide locationing services to other mobile devices 208 in the store and allow communication with other access points 202 of the network. In the prior art, enrollment mode required all the ultrasonic devices in the store to stop at periodic intervals to locate all new mobile devices in the store. This interrupts locationing. The present invention has the advantage of only interrupting locationing services in a small region of the store where the new mobile device is located, and allowing other mobile devices in other regions to continue locationing without interruption and without degrading the location update rates.

Figure 3:
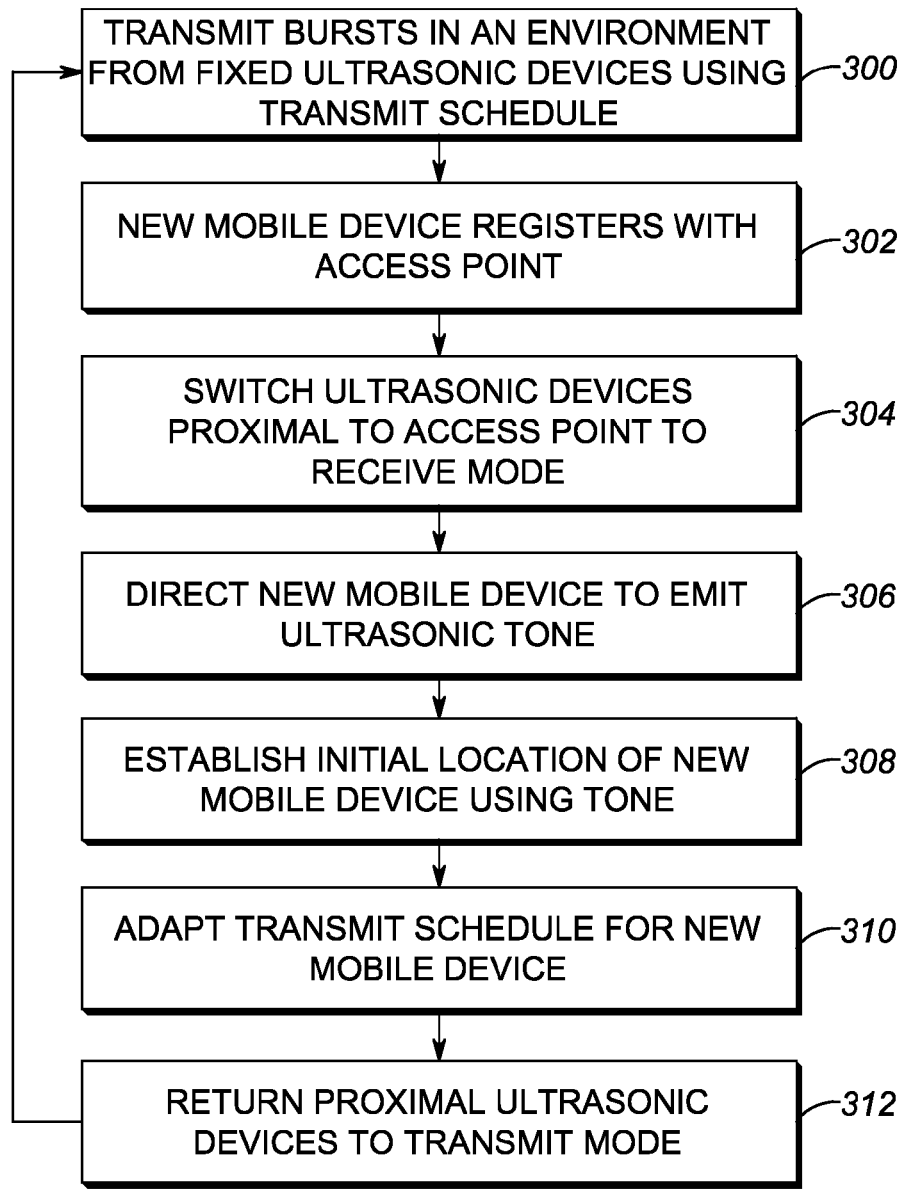
FIG. 3 is a flow diagram illustrating a method, in accordance with some embodiments of the present invention.

FIG. 3 is a flowchart illustrating a method for automatically changing modes for ultrasonic locationing of a mobile device within an environment, according to some embodiments of the present invention.

A first step 300 includes transmitting ultrasonic pulses to be used for locationing of mobile communication devices within the environment in accordance with a transmit schedule by a plurality of fixed ultrasonic devices within the environment operating in a transmit mode. The transmit schedule includes an individually-assigned time-slice for each mobile communication device to perform locationing using the ultrasonic pulses transmitted during that time-slice. Time-of-flight information and/or signal strength information can be used for locationing of the mobile communication device. In practice, the emitters are affixed to a ceiling of the environment and oriented towards a floor of the environment to provide a limited region for communication with mobile devices. The ultrasonic pulses utilized each have a frequency between 19 kHz and 22.05 kHz.

A next step 302 includes determining when a fixed access point within the environment begins serving a newly registered mobile communication device. This step also includes determining that the newly registered mobile communication device is operable to be enrolled for ultrasonic locationing.

A next step 304 includes instructing only those ultrasonic devices proximal to the serving access point to deactivate their transmit mode and switch to a receive mode to listen for an ultrasonic acoustic tone from the newly registered mobile communication device. In practice, the proximal ultrasonic devices include at least three ultrasonic devices proximal to the serving access point.

A next step 306 includes directing the newly registered mobile communication device to emit the ultrasonic acoustic tone. The ultrasonic acoustic tone used will have a frequency between 19 kHz and 22.05 kHz, and the mobile device utilizes existing, unmodified audio circuitry for receiving the pulses and emitting the acoustic tone.

A next step 308 includes establishing an initial location of the newly registered mobile communication device using measurements of the ultrasonic acoustic tone at each proximal ultrasonic device. This step can include measuring a signal strength of the ultrasonic acoustic tone at each proximal ultrasonic device, indicative of a distance between the newly registered mobile communication device and each proximal ultrasonic device, and used to establish the initial location.

A next step 310 includes adapting the transmit schedule to accommodate the newly registered mobile communication device at the initial location.

A next step 312 includes returning the proximal ultrasonic devices to transmit mode using the adapted transmit schedule.

The above steps can be repeated periodically to keep track of mobile devices moving within, entering, or leaving the environment.

Advantageously, the present invention provides a significant improvement in the way in which new mobile devices are added into a locationing system, in that it does not require wasted time slots to perform RSSI enrollment periods every time a new mobile device enters the system. With knowledge of which Wi-Fi access point is in use, it is possible to conclude that certain locationing devices are nowhere near the new mobile device and therefore can remain in micro-locationing mode without interrupting the current mobile devices they are servicing. This will greatly improve system performance and the average update rate of the locationing system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available tune, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for automatically changing modes for ultrasonic locationing of a mobile device within an environment, the method comprising:
    transmitting ultrasonic pulses to be used for locationing of mobile communication devices within the environment in accordance with a transmit schedule by a plurality of fixed ultrasonic devices within the environment;
    determining when a fixed access point within the environment begins serving a newly registered mobile communication device;
    instructing only those ultrasonic devices proximal to the serving access point to deactivate their transmit mode and switch to a receive mode to listen for an ultrasonic acoustic tone from the newly registered mobile communication device;
    directing the newly registered mobile communication device to emit the ultrasonic acoustic tone;
    establishing an initial location of the newly registered mobile communication device using measurements of the ultrasonic acoustic tone at each proximal ultrasonic device;
    adapting the transmit schedule to accommodate the newly registered mobile communication device at the initial location; and
    returning the proximal ultrasonic devices to transmit mode using the adapted transmit schedule.

2. The method of claim 1, wherein the establishing step includes measuring a signal strength of the ultrasonic acoustic tone at each proximal ultrasonic device, indicative of a distance between the newly registered mobile communication device and each proximal ultrasonic device, and used to establish the initial location.

3. The method of claim 1, wherein the acoustic tone lasts approximately 200 milliseconds.

4. The method of claim 1, wherein the transmit schedule includes an individually-assigned time-slice for each mobile communication device to perform locationing using the ultrasonic pulses transmitted during that time-slice.

5. The method of claim 1, wherein the proximal ultrasonic devices include at least three ultrasonic devices proximal to the serving access point.

6. The method of claim 1, wherein the determining step also includes determining that the newly registered mobile communication device is operable to be enrolled for ultrasonic locationing.

7. The method of claim 1, where in the transmitting step the emitters are affixed to a ceiling of the environment and oriented towards a floor of the environment to provide a limited region for the mobile communication devices to receive the ultrasonic pulses.

8. The method of claim 1, where in the transmitting and directing steps the ultrasonic pulses and acoustic tone utilized each have a frequency between 19 kHz and 22.05 kHz and the mobile device utilizes existing, unmodified audio circuitry for receiving the pulses and emitting the acoustic tone.

9. The method of claim 1, wherein the ultrasonic pulses in the transmitting step provide time-of-flight information used for locationing of the mobile communication device.

10. A system for automatically changing modes for ultrasonic locationing of a mobile device within an environment, the system comprising:
- a plurality of fixed ultrasonic devices within the environment, the ultrasonic devices each including an ultrasonic emitter and microphone, the ultrasonic emitters operable, in a transmit mode, to transmit ultrasonic pulses to be used for locationing of mobile communication devices within the environment in accordance with a transmit schedule;
- a plurality of fixed access points within the environment and operable on a communication network;
- at least one mobile communication device operable to register with one of the access points; and
- a backend controller coupled to the access points and the ultrasonic devices, the backend controller operable to:
  - determine when an access point begins serving a newly registered mobile communication device,
  - instructing only those ultrasonic devices proximal to the serving access point to switch to a receive mode that activates their associated microphones and deactivates their associated emitters,
  - directing, via the serving access points, the newly registered mobile communication device to emit an ultrasonic acoustic tone,
  - establishing an initial location of the newly registered mobile communication device using measurements of the ultrasonic acoustic tone at each proximal ultrasonic device,
  - adapting the transmit schedule to accommodate the newly registered mobile communication device at the initial location, and
  - returning the proximal ultrasonic devices to transmit mode using the adapted transmit schedule.

11. The system of claim 10, wherein the microphones provide measurements of a signal strength of the ultrasonic acoustic tone at each proximal ultrasonic device, indicative of a distance between the newly registered mobile communication device and each proximal ultrasonic device, and used to establish the initial location.

12. The system of claim 10, wherein the acoustic tone lasts approximately 200 milliseconds.

13. The system of claim 10, wherein the transmit schedule includes an individually-assigned time-slice for each mobile communication device to perform locationing using the ultrasonic pulses transmitted during that time-slice.

14. The system of claim 10, wherein the proximal ultrasonic devices include at least three ultrasonic devices proximal to the serving access point.

15. The system of claim 10, wherein the newly registered mobile communication device is operable to be enrolled for ultrasonic locationing.

16. The system of claim 10, where the emitters of the fixed ultrasonic devices are affixed to a ceiling of the environment and oriented towards a floor of the environment to provide a limited region for the mobile communication devices to receive the ultrasonic pulses.

17. The system of claim 10, wherein the ultrasonic pulses and acoustic tone utilized each have a frequency between 19 kHz and 22.05 kHz and the mobile device utilizes existing, unmodified audio circuitry for receiving the pulses and emitting the acoustic tone.

18. The system of claim 10, wherein the ultrasonic pulses provide time-of-flight information used for locationing of the mobile communication device.

\* \* \* \* \*